(12) United States Patent
Sato et al.

(10) Patent No.: US 7,021,176 B2
(45) Date of Patent: **\*Apr. 4, 2006**

(54) LINK PLATE FOR SILENT CHAIN AND METHOD OF MANUFACTURING SAME

(75) Inventors: Toshifumi Sato, Osaka (JP); Toru Okabe, Osaka (JP)

(73) Assignee: Tsubkimoto Chain Co., Osaka (JP)

( * ) Notice: Subject to any disclaimer, the term of this patent is extended or adjusted under 35 U.S.C. 154(b) by 67 days.

This patent is subject to a terminal disclaimer.

(21) Appl. No.: 10/818,149

(22) Filed: Apr. 5, 2004

(65) Prior Publication Data

US 2004/0261393 A1    Dec. 30, 2004

(30) Foreign Application Priority Data

Jun. 24, 2003  (JP)  ............................. 2003-179789

(51) Int. Cl.
*B21L 9/04* (2006.01)
*B27B 13/00* (2006.01)

(52) U.S. Cl. ............................. 76/29; 76/30; 76/80.5; 76/112

(58) Field of Classification Search .................. 76/29, 76/30, 80.5, 112
See application file for complete search history.

(56) References Cited

U.S. PATENT DOCUMENTS 4,088,047 A * 5/1978 Ratz et al. ..................... 76/112

FOREIGN PATENT DOCUMENTS

JP    2002-028749    1/2002

OTHER PUBLICATIONS

U.S. Appl. No. 10/813,256, Link Plate for Roller Chain and Method of Manufacturing Same, Inventors Name, Toshifumi Satou, Filing Date Mar. 30, 2004.

* cited by examiner

Primary Examiner—Charles Goodman
(74) Attorney, Agent, or Firm—Howson and Howson (57) ABSTRACT

In the manufacture of a link plate for a silent chain, a band of sheet steel is intermittently forwarded to string of punching dies and shaving dies. The band tends to follow a slightly curved path, which causes alignment errors in a conventional punching and shaving operation. However, in this case, each shaving die and its corresponding punching die are disposed in symmetrical relationship with respect to an intermediate position along the path of movement of the band, and the intermediate position coincides with the location at which the deviation of the band. As a result, the shaving dies are more accurately aligned with the punched surfaces produced by the corresponding punching dies.

2 Claims, 7 Drawing Sheets

LINK PLATE FOR SILENT CHAIN AND METHOD OF MANUFACTURING SAME

FIELD OF THE INVENTION

This invention relates to silent chains, and specifically relates to a method of manufacturing a link plate for silent chain.

BACKGROUND OF THE INVENTION

A conventional process for manufacturing a link plate for a silent chain is depicted in FIGS. 1 to 7 of Japanese Laid-open Patent Publication No. 2002-28749. In the conventional process, after the outline of the meshing tooth surface is punched from a band of sheet steel, the inside tooth surfaces and the crotch portion of the link plate are simultaneously shaved, so that the surfaces are made uniformly smooth. As a result, the formation of microscopic cracks is prevented, and the fatigue strength of the link plate is enhanced.

Figure 5:
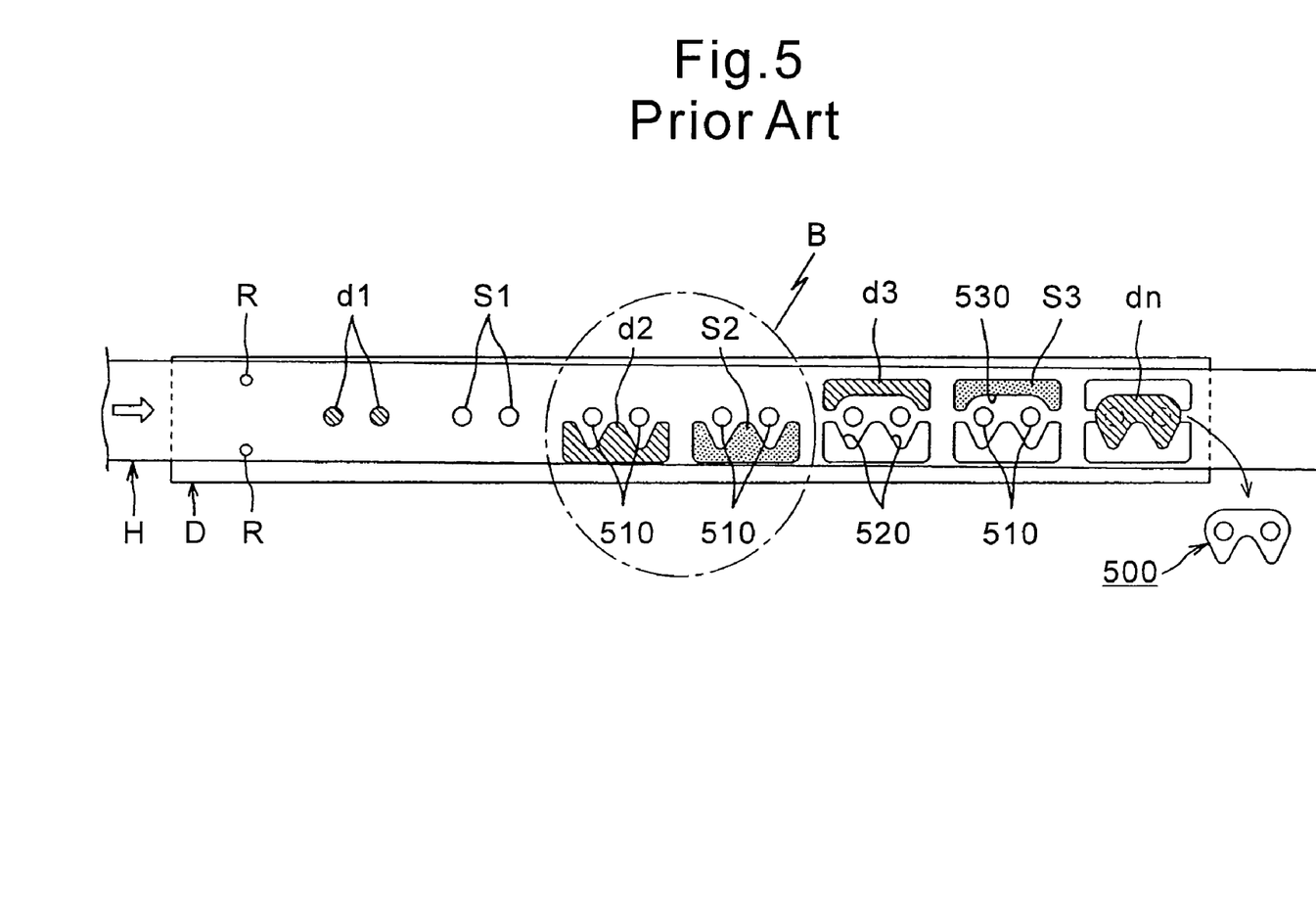
FIG. 5 is a schematic view illustrating a conventional method of manufacturing a link plate for a silent chain.
Figure 6:
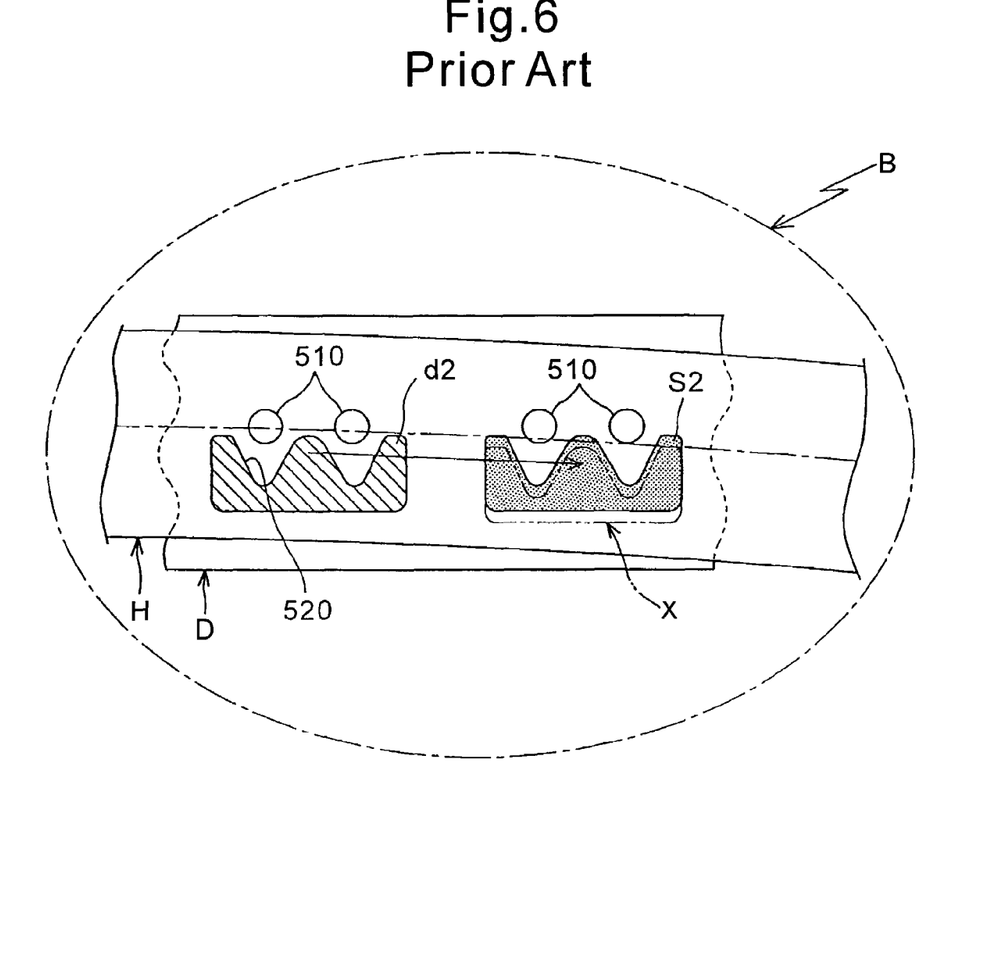
FIG. 6 is an enlarged view of region B in FIG. 5.
Figure 7:
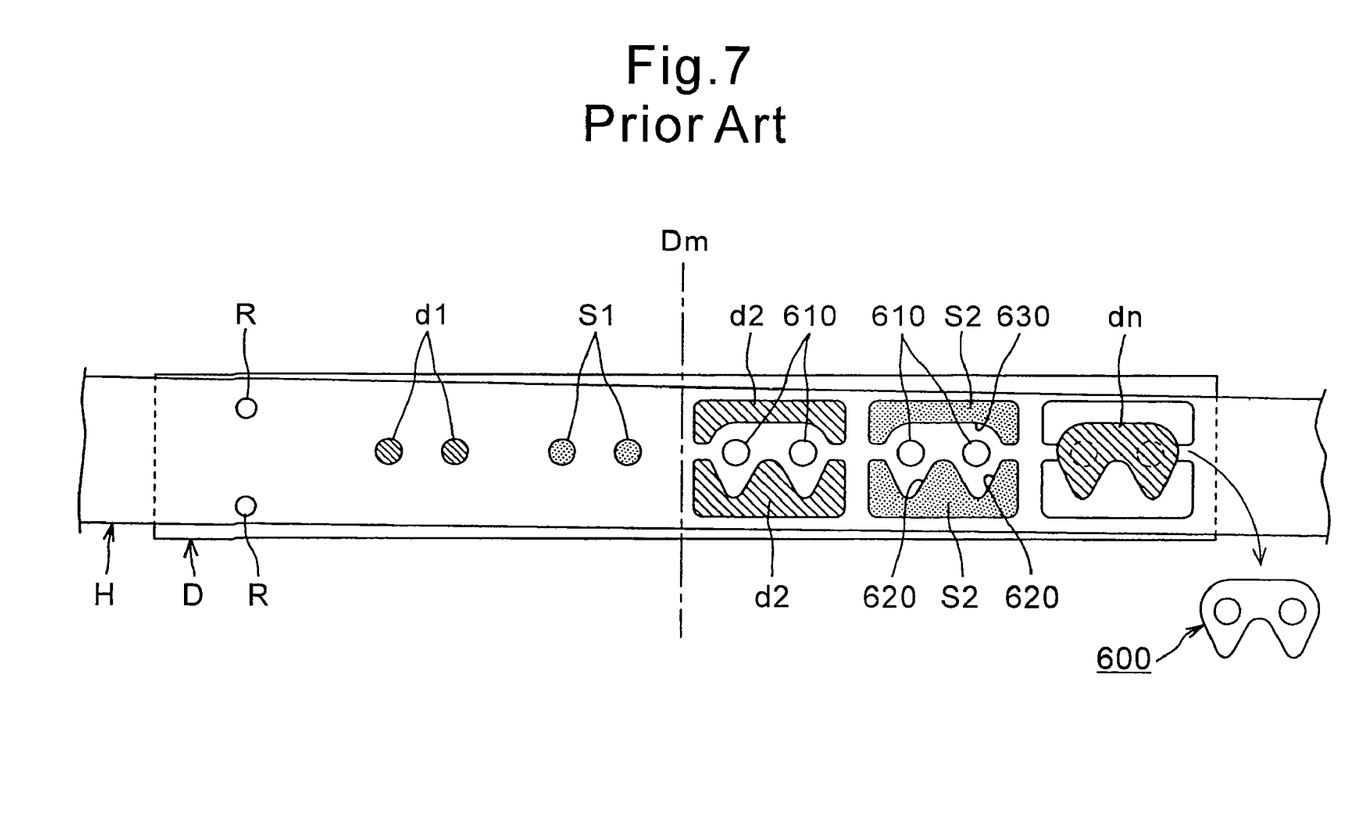
FIG. 7 is a schematic view illustrating another conventional method of manufacturing a link plate for a silent chain.

Conventional processes for manufacturing a link plate for a silent chain, are illustrated in FIGS. 5 to 7 of this application.

As shown in FIG. 5, in the formation of a particular link plate 500, rough punching and shaving are performed by a die assembly D, on a band H of sheet steel, which is intermittently forwarded past the die assembly. First, connecting pin holes are punched by dies d1 to form inner hole surfaces 510. Then, the steel band is indexed forward and the connecting pin holes are shaved by shaving dies S1. In the next step, the meshing tooth surfaces 520, which are shaped to mesh with sprockets, are formed by punching die d2. The meshing tooth surfaces are then shaved by shaving die S2. Following the shaving of the meshing tooth surfaces the link plate back surface 530, which slides on the shoe surface of a chain guide, is formed by punching die d3. Then the back surface 530 is shaved by die S3. Finally the link plate 500 is separated from the steel band by die dn.

After the band H is pulled from a supply roll (not shown) it is intermittently forwarded into the punching and shaving die assembly D, using pilot holes R as a reference. After punching, the remainder of the band H is recovered by winding it onto a take-up roll (not shown). A very slight bending or strain generated as the band H is wound onto the supply roll causes snaking of the band H as it is forwarded past the die assembly. As shown on a larger scale in FIG. 6, which is an enlarged view of a region B in FIG. 5, the snaking movement of the band H results in a lateral displacement of the band by a distance X as it moves from the location at which the meshing tooth surfaces are formed by punching die d2, to the location at which the same meshing tooth surfaces are shaved by shaving die S2. The displacement X increases if the shaving die S2 in the die assembly D is closer to the take-up roll.

In the case of a relatively small shaving margin, e.g., a margin of about 0.1 mm, lateral displacement of the band H can cause a portion of the meshing tooth surface not to be shaved. As a result, the desired shear surface ratio and surface roughness may not be obtained, and the wear elongation of the chain is increased. Furthermore, in the portions of the link plate tooth surface where shaving is not performed, microscopic cracks are generated. Chain breakage occurs due to the microscopic cracks, and the required chain strength cannot be maintained for a long period of time. Additionally, whereas ring-shaped chips would ordinarily be produced and discharged in the case of perfect alignment between the shaving die and the roughly punched link plate, the punching displacement X causes the chips to be only partially cut off, and the partially cut off chips are not perfectly discharged. Parts of the chips remain as flaws on the link plates 500, reducing the quality of the link plates.

An additional problem is that, because of the bending of the band H as it moves past the die assembly D, the accuracy of the distance between the punched inner surfaces 510 of the connecting pin holes and the punched meshing tooth surface 520 cannot be maintained. The variations in the distance between the connecting pin holes and the meshing tooth surfaces result in variations in meshing of the chain with the sprocket, which leads to a reduction in chain strength.

A further problem encountered in the conventional method of forming silent chain link plates was that the accuracy of the distance between the inner surfaces 510 of the connecting pin holes and the back surface 530 of the plates could not be maintained. These distance variations result in variations in the positions of the plate back surfaces 530 relative to the chain travel line, causing accelerated wear of the shoe of a chain guide.

Another conventional method of manufacturing a link plate 600 for a silent chain is shown in FIG. 7. Rough punching of the connecting pin holes is first carried out. Then, their inner surfaces 610 are shaved. After punching and shaving of the connecting pin holes, the meshing tooth surfaces 620 and the link plate back surface 630 are punched simultaneously. Then the meshing tooth surface 620 and the plate back surface 630 are shaved simultaneously. The same problems as experienced in the process depicted in FIGS. 5 and 6 are experienced in the process of FIG. 7. Snaking of the band H of sheet steel causes lateral displacement of the band between the punching and shaving stations, resulting in incomplete shaving, the formation of microscopic cracks, and variations in the distances between the connecting pin holes and the meshing and back surfaces of the link plates.

The objects of the invention are to solve the above-described problems experienced in conventional processes of forming link plates for silent chains. More particularly, an object of the invention is to suppress displacement of the band of sheet steel between the shaving and punching stages even when bending of the band occurs as it is forwarded past the punching and shaving die assembly. Other objects of the invention include improvement in the uniformity of the link plates, improvement in finishing accuracy of the meshing tooth surfaces, the back surfaces of the link plates, and the connecting pin holes, achievement of an accurate parallel relationship between the outer peripheral surfaces of the link plate and the inner peripheral surfaces of the connecting pin holes, and achievement of an accurate perpendicular relationship between the flat faces of the link plates and the outer and inner peripheral surfaces formed by punching.

SUMMARY OF THE INVENTION

The term "shaving" as used herein refers to a secondary processing step in the fabrication of a link plate, in which a bar-shaped or cylindrical shaving punch having a contour slightly different from that of the rough punch used in the primary punching step is used. In the shaving step, the shaving punch removes a small amount of the contour of the roughly punched portion of the link plate, to remove rough surfaces and shear drops generated in the primary punching step. The shaving process reduces surface roughness and leads to improved surface accuracy.

The shaving process will be explained in the context of a link plate in which both the are shaved. However, it should be understood, that, in the case of a link plate for a silent chain, designed for inside meshing with a sprocket, it is only necessary for the inside tooth surfaces to be subjected to shaving. On the other hand, in the case of a link plate designed for outside meshing with a sprocket, both the inside and outside tooth surface are subjected to shaving.

The die assembly includes punching dies for forming the meshing tooth surfaces, the inner surfaces of the connecting pin holes inner surface, and the back surfaces of the link plates, as well as shaving dies for shaving those surfaces. These punching and shaving dies are disposed at regular intervals in the die assembly.

In accordance with the invention, a toothed link plate for a silent chain is manufactured by intermittently forwarding a band of sheet steel along a path past a plurality of dies arranged in succession along the direction in which the band is forwarded. At least one of the dies is a rough punching die, and at least one other one of the dies is a shaving die. The rough punching die and the shaving die are positioned symmetrically in relation to, and on opposite sides of, an intermediate position along the direction in which the band of sheet steel is forwarded. The rough punching die punches out a portion of the band to form an edge of a link plate, which may be a meshing tooth surface, a back surface of the link plate, an inner peripheral surface of a connecting pin hole, or a combination of two or more such surfaces. The same surface or combination of surfaces are shaved by the shaving die. Even though the band of steel sheet deviates laterally relative to a straight line extending along the direction in which the band is forwarded, the lateral deviation of the band of sheet steel from the straight line reverses at a fixed location along the path of the band, substantially coinciding with the intermediate position about which the punching and shaving dies are symmetrically disposed. Thus, in the shaving step, the shaving die is closely aligned with the edge formed by the rough punching die.

Because the punching and shaving of corresponding parts of the link plate are carried out at locations symmetric with respect to an intermediate location coinciding with the reversal of the lateral deviation of the band of sheet steel, the lateral displacement of the band of sheet steel, as it moves from the punching die to the shaving die is reduced to about one-half the displacement in the conventional punching and shaving process.

Where rough punching is performed just ahead of the intermediate location and shaving is performed just beyond the intermediate location the lateral displacement is suppressed to the greatest possible extent.

Since the lateral displacement between the band of sheet steel and the shaving die is suppressed, the shaving margin can be minimized. The shear surface ratio and surface smoothness are optimized and the generation of microscopic cracks is suppressed. Thus, when the link plates are assembled to form a silent chain, the chain strength is maintained over a long period of time. Moreover, because the right angle relationship between the tooth surfaces and the side faces of the link plates is accurately maintained, the link plates mesh with the tooth surfaces of a sprocket uniformly. Likewise, the inner surfaces of the connecting pin holes are accurately maintained at a right angle relation ship with the side faces of the link plates, so that the connecting pins contact the connecting pin holes over a large surface area, and wear elongation is suppressed. Finally, the accuracy of the relationship between the connecting pin holes and the plate back surfaces is ensured so that variations in the positions of plate back surfaces with respect to the chain traveling line are minimized.

DETAILED DESCRIPTION OF THE PREFERRED EMBODIMENTS

Figure 1:
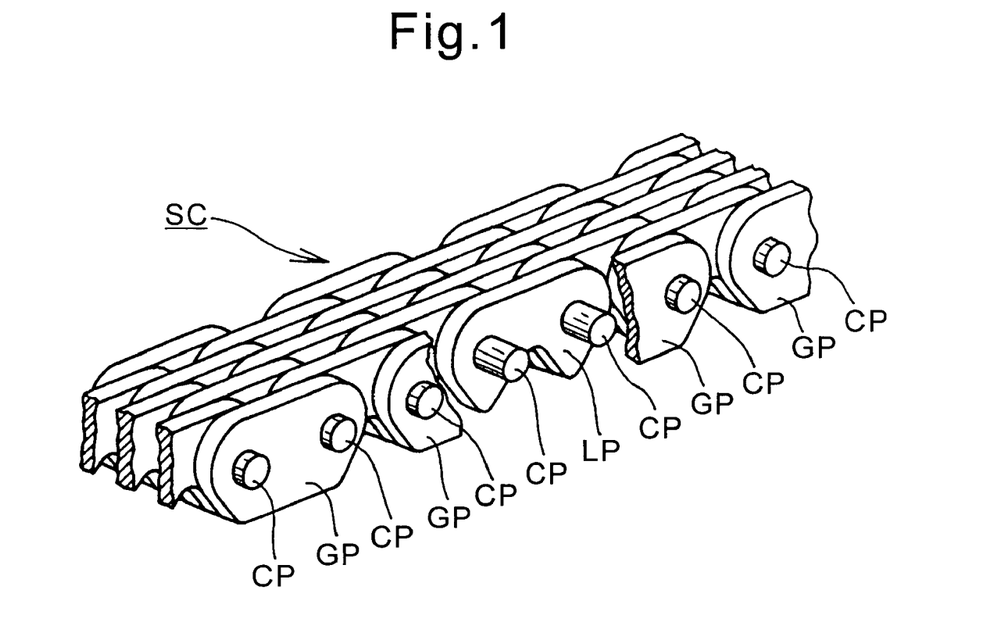
FIG. 1 is a perspective view of a silent chain in accordance with the invention.

In FIG. 1 a silent chain SC assembled from link plates made in accordance with the invention, comprises guide plates GP and link plates LP disposed between the guide plates GP. The plates are interleaved and connected in an endless loop by connecting pins CP.

Figure 2:
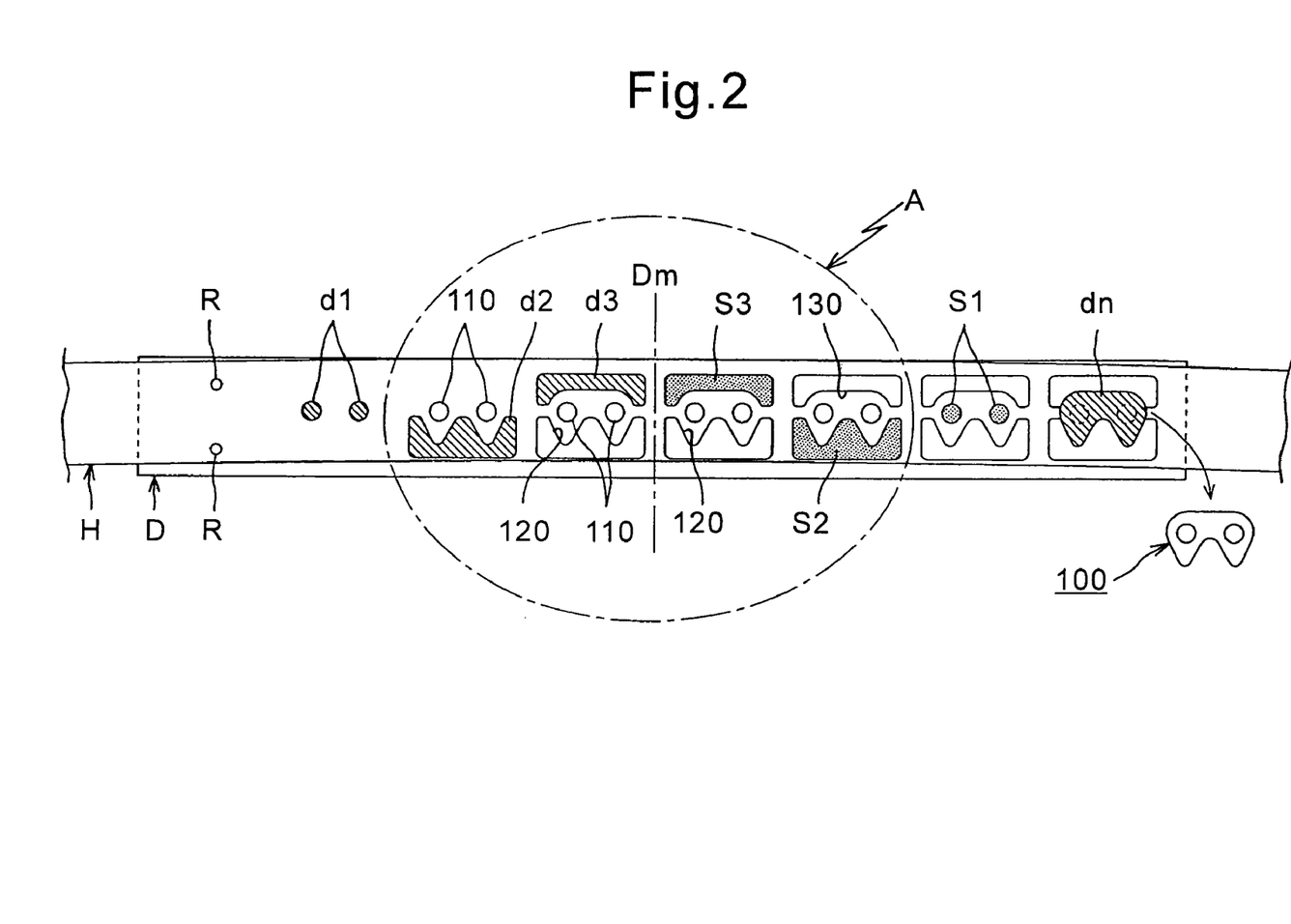
FIG. 2 is a schematic view illustrating a method of manufacturing a link plate for a silent chain, in accordance with an embodiment of the invention.
Figure 3:
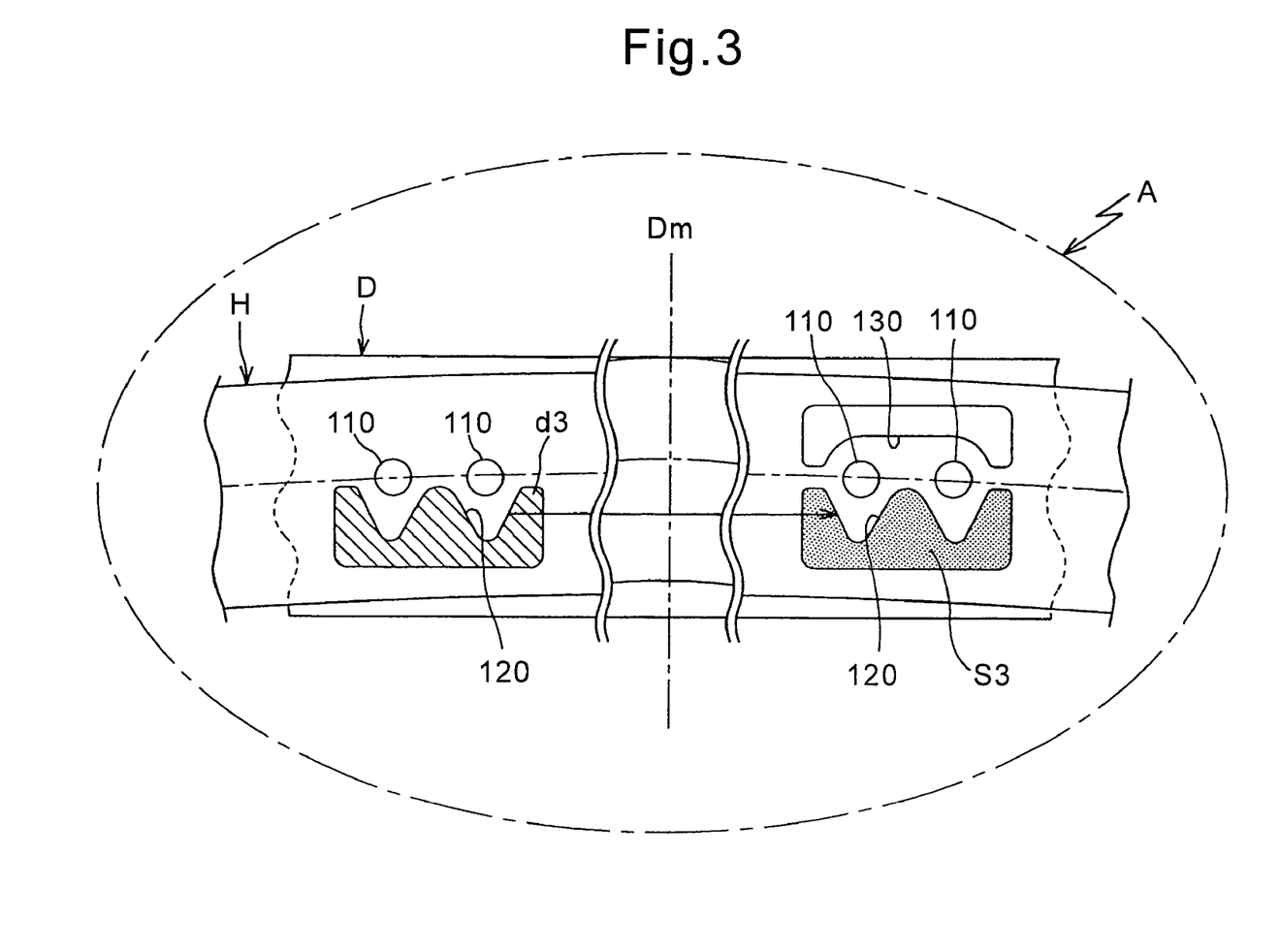
FIG. 3 is an enlarged view of region A in FIG. 2.

In the method of manufacturing a link plate for a silent chain illustrated in FIGS. 2 and 3, a link plate 100 comprises connecting pin holes 110, a meshing tooth surface 120 and a back surface 130. A band H of sheet steel is intermittently forwarded to an assembly of dies including rough punching dies d1, d2 and d3, and a series of shaving dies S3, S2 and S1. The rough punching die d1 forms the connecting pin holes, rough punching die d2 forms the meshing tooth surface 120, and rough punching die d3 forms the back surface 130. After the rough punching steps, shaving die S3 shaves the back surface 130, shaving die S2 shaves the meshing tooth surface 120, and shaving die S1 shaves the inner peripheral surfaces of the connecting pin holes. Die dn carries out a final punching step by which the completed link plate 100 is removed from the band H.

As will be apparent from FIG. 2, the dies d3 and S3 are disposed in symmetrical relationship to an intermediate position Dm, which substantially coincides with the location of reversal of the deviation of the band H from a straight line extending in the direction in which the band is forwarded. The location Dm may be determined empirically, but is typically midway between the supply and take-up reels for the band H. Dies d2 and S2 are likewise symmetrical with respect to location Dm, as are dies d1 and S1.

The portions of the band H on opposite sides of the intermediate position Dm may be made symmetrical with respect to position Dm by the use of a guide (not shown) which can be part of the band forwarding mechanism.

Where snaking occurs in the band H, as it is forwarded from a supply roll past the die assembly D, using pilot holes R as a reference, symmetry of the band on opposite sides of the intermediate position Dm is ensured. Thus, when the inner peripheral surfaces of the connecting pin holes, the meshing tooth surfaces and the plate back surfaces are shaved, the lateral displacement of those surfaces from the positions at which they are formed by the punching dies is suppressed to about half the displacement which occurs in conventional silent chain link plate processing.

The pilot holes R are provided for properly forwarding the band H past the die assembly D, but are not used for correcting bending.

Where rough punching and shaving are performed respectively just ahead of, and just behind, the intermediate position Dm, the lateral displacement resulting from bending of the band H is suppressed to the greatest extent possible. Thus, in the case of FIG. 2, where the dies d3 and S3 punch and shave the back surfaces of the link plates, the lateral displacement of the back surfaces 130 is minimized.

Suppression of the lateral displacement of the band H between each punching die and its corresponding shaving die allows a shaving margin in the range 70% or more of the sheet thickness to be achieved, so that a good shear surface is formed and the generation of a microscopic cracks, punching flaws, remainder flaws and the like, which occur in conventional processing, are avoided. Accordingly the desired shear surface ratio and surface smoothness are obtained, and the wear elongation properties of the chain and chain strength can be maintained over a long period of time.

A shaving margin of 70% or more of the sheet thickness, obtained at the inner peripheral surfaces of the connecting pin holes, allows good area contact to be maintained between the connecting pin holes and the connecting pins CP. Likewise, a shaving margin of 70% or more of the sheet thickness at the meshing tooth surfaces 120 results in improved meshing with the sprockets. The plate back surface 130 can also be shaved by the processing die S2 to achieve a shaving margin of 70% or more of the sheet thickness, so that contact of the back surfaces of the links with a shoe surface of a chain guide is made more uniform, for a remarkable decrease in power loss when the chain is used for power transmission.

Figure 4:
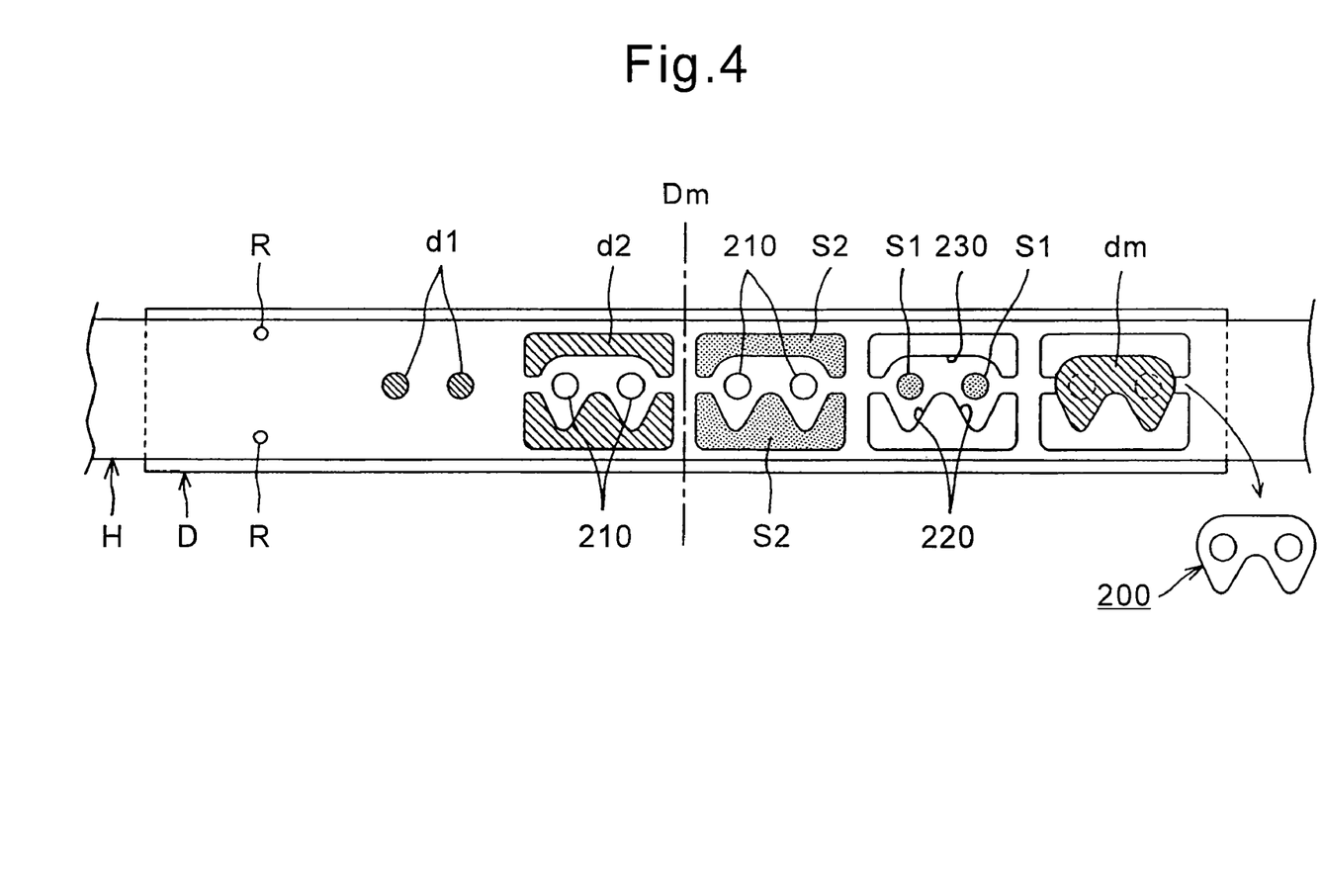
FIG. 4 is a schematic view illustrating a method of manufacturing a link plate for a silent chain, in accordance with another embodiment of the invention.

In the alternative embodiment illustrated in FIG. 4, a link plate 200 has a connecting pin hole inner peripheral surface 210, a meshing tooth surface 220, and a back surface 230. In this embodiment, the connecting pin holes are rough punched and shaved respectively by dies d1 and S1. However, the rough punching die d2 simultaneously forms the meshing tooth surface 220 and the plate back surface 230, and shaving die S2, corresponding to the rough punching die d2, simultaneously shaves the meshing tooth surface and the back surface. Here, as in the case of FIG. 2, a die dn finally punches the link plate 200 from the band H.

Since the meshing tooth surfaces and the back surfaces are punched and shaved at locations close to, and symmetrical with respect to the intermediate location Dm, which coincides with the reversal of the deviation of the band H from a straight line along the direction in which the band is forwarded, the displacement of the band as it moves from die d2 to die S2 is minimized, and the roughly punched meshing tooth surfaces as well as the roughly punched plate back surfaces are closely aligned with the shaving die S2. Since the meshing tooth surfaces and the back surfaces are punched simultaneously and shaved simultaneously, the dies d1 and S1, for punching and shaving the connecting pin holes can be closer to the intermediate position Dm that in the case of FIG. 2, and accordingly the displacement of the band as it moves from die d1 to die S1 is also reduced.

As in the case of FIG. 2, a shaving margin of 70% or more of the sheet thickness can be reliably achieved. As in the case of FIG. 2, the symmetry of the band relative to the intermediate location Dm can be determined by a forwarding control mechanism comprising a guide or the like (not shown). In the alternative embodiment illustrated in FIG. 4, a good shear surface is formed, and microscopic cracks, punching flaws, remainder flaws, and the like are avoided. Accordingly, the desired shear surface ratio and surface smoothness are obtained, and the wear elongation properties of the chain and chain strength can be maintained over a long period of time.

Since the meshing tooth surfaces 220 and the plate back surface 230 of the link plate are punched simultaneously, and also shaved simultaneously, parallelism and uniform distance between these surfaces are enhanced. As a result, for example, the meshing tooth surfaces abut the sprocket teeth surface at a right angle so that stable and uniform meshing is obtained and vibration and noises during meshing are prevented. Furthermore, wear due to one-sided contact between an inner connecting pin hole surface 210 and a connecting pin CP is decreased, so that wear elongation of the silent chain SC is suppressed.

Although two specific embodiments have been described with reference to FIGS. 2 and 4, advantages of the invention can be realized in other embodiments. Thus, for example, rough punching can be simultaneously performed on connecting pin holes and the meshing tooth surfaces, which can also be shaved simultaneously.

With the invention, even though snaking may occur in the band of sheet steel forwarded from a supply roll to the link plate punching and shaving die assembly, the positions of the corresponding punching and shaving dies are symmetrical relative to the intermediate position, which substantially coincides with the reversal of the deviation of the band from a straight line extending in the direction in which the band is forwarded. Lateral displacement of the band as it is forwarded from a punching die to a corresponding shaving die is suppressed to about half of the conventional level of displacement, and more uniform quality of the link plate is ensured.

Where punching takes place just ahead of the intermediate position, and a corresponding shaving step, i.e., shaving of the same surface that was punched in the punching step, takes place just beyond the intermediate position, lateral displacement caused by bending of the band of sheet steel is suppressed to the greatest possible extent, and uniform quality of the link plate is ensured.

Superior finishing accuracy at the meshing tooth surfaces, the inner peripheral surfaces of the connecting pin holes, and/or the guide shoe-contacting plate back surface is achieved. A right angle relationship between these surfaces and the flat side faces of the link plate can also be attained.

When two of the surfaces are punched simultaneously, and shaved simultaneously, further improvement in parallelism of the surfaces and uniform accuracy of the distance between them can also be realized.

What is claimed is:

1. A method of manufacturing a toothed link plate for a silent chain, comprising the steps of:
    intermittently forwarding a band of sheet steel along a path past a plurality of dies arranged in succession along the direction in which said band of sheet steel is forwarded, wherein at least one of said dies is a rough punching die shaped to form a pair of teeth of a silent chain link plate, and at least one other one of said dies is a shaving die shaped to shave a pair of teeth of a silent chain link plate, said rough punching die and said shaving die being positioned symmetrically in relation to, and on opposite sides of, an intermediate position along said direction;

punching said band of steel sheet by said rough punching die, thereby punching out a portion of said band to form a toothed edge of a silent chain link plate; and shaving said toothed edge of said silent chain link plate by said shaving die;

wherein said band of steel sheet deviates laterally relative to a straight line extending along said direction, and the lateral deviation of said band of sheet steel from said straight line reverses at a fixed location along said path substantially coinciding with said intermediate position;

whereby, in said shaving step, said shaving die is closely aligned with said toothed edge of a silent chain link plate formed by said rough punching die.

2. A method according to claim 1, in which, in the shaving step, at least two of a meshing tooth surface of the link plate, an inner peripheral surface of a connecting pin hole in the link plate, and a back surface of the link plate, are shaved simultaneously.

* * * * *

UNITED STATES PATENT AND TRADEMARK OFFICE
CERTIFICATE OF CORRECTION

| | |
|---|---|
| PATENT NO. | : 7,021,176 B2 |
| APPLICATION NO. | : 10/818149 |
| DATED | : April 4, 2006 |
| INVENTOR(S) | : Toshifumi Sato and Toru Okabe |

It is certified that error appears in the above-identified patent and that said Letters Patent is hereby corrected as shown below:

On title page (item 73) "Tsubkimoto Chain Co." should read --Tsubakimoto Chain Co.--

Signed and Sealed this

Twenty-ninth Day of August, 2006

JON W. DUDAS
*Director of the United States Patent and Trademark Office*